Figure 1:
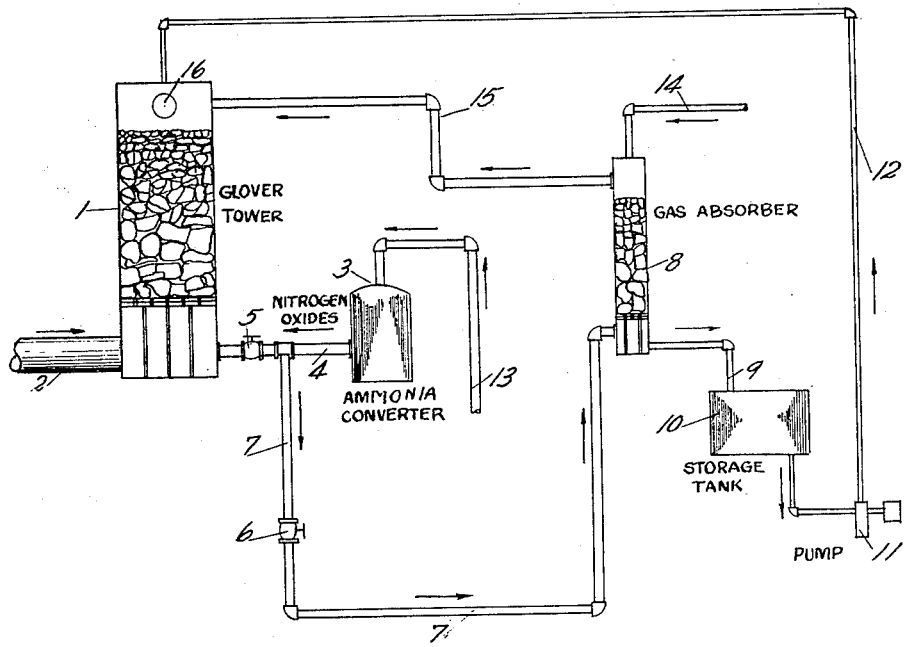

April 14, 1931. A. M. FAIRLIE 1,800,786
AMMONIA OXIDATION EQUIPMENT AND THE USE THEREOF
FOR THE MANUFACTURE OF SULPHURIC ACID
Filed Aug. 12, 1926

INVENTOR

Patented Apr. 14, 1931

1,800,786

UNITED STATES PATENT OFFICE

ANDREW M. FAIRLIE, OF ATLANTA, GEORGIA

AMMONIA OXIDATION EQUIPMENT AND THE USE THEREOF FOR THE MANUFACTURE OF SULPHURIC ACID

Application filed August 12, 1926. Serial No. 128,889.

My improvement pertains particularly to methods of manufacturing sulphuric acid in which nitrogen oxides are supplied, in part at least by the oxidation of ammonia.

It is well known that in the manufacture of sulphuric acid by nitration processes, a portion of the nitrogen oxides, varying usually between 10 and 20 per cent of the total quantity of nitrogen oxides used in the process, is continuously lost, due chiefly to incomplete efficiency of the apparatus for the recovery of such nitrogen oxides; and that such loss must be continuously compensated for by the supply of fresh nitrogen oxides from some source outside the sulphuric acid plant. For many years this outside source was nitrate of soda, but within recent years ammonia has been used as the outside source, and at various sulphuric acid plants equipment has been installed for the production of oxides of nitrogen from the combustion of ammonia. Owing to irregularities in the quantity of sulphuric dioxide supplied to any such plant per unit of time, or to other causes, the quantity of nitrogen oxides required by such acid plant is not constant, but varies from hour to hour, and even from day to day, and heretofore it has been considered necessary, in installing ammonia oxidation equipment at a sulphuric acid plant, to install equipment of such capacity as will supply the maximum hourly requirements of the acid plant for nitrogen oxides, or, in other words, large enough to take care of the peak requirements. There are two important objections, however, to doing this. In the first place, the peak hourly requirements are so very much larger than the average hourly requirements, that the cost of the ammonia oxidation equipment is greatly increased above the cost of equipment for merely average hourly requirements. Secondly, when ammonia oxidation equipment competent to take care of maximum hourly requirements is installed, its normal capacity is so great that it cannot be operated at a rate to supply minimum hourly requirements without serious reduction in operating efficiency and hence, serious monetary loss. The object of this invention is to provide a storage reservoir for nitrogen oxides, to be filled during periods of low hourly requirements of the acid plant, and to be used during high hourly requirements, thereby permitting the operation of the ammonia oxidation equipment at or near average or normal capacity, and therefore at maximum efficiency, continuously.

Specifically, my invention consists in providing equipment for the absorption of nitrogen oxides in a suitable liquid, preferably either water or sulphuric acid, and for the storage of the resultant nitric acid, or mixed nitric and sulphuric acids, or nitrososulphuric acid, and for the utilization of such stored acid or mixture of acids in the sulphuric acid process, to meet the super-normal demands of such process for nitrogen oxides.

If desired, the absorbing liquid may be dilute nitric acid, which, by coming into direct contact with surplus oxides of nitrogen from the ammonia converter, will become fortified. Or, the absorbing liquid may be nitrososulphuric acid, or nitrous vitriol, in which case the resultant liquid would be a mixture of nitrous vitriol and nitric acid. The absorbing liquid may, if desired, be recirculated, or a portion may be recirculated, repeatedly over the same absorbing apparatus, to increase its nitrosity. The absorption equipment may consist of a packed tower or towers, provided with liquid feed at the top and liquid outlet at the bottom; or of an unpacked tower or chamber in which liquid may be sprayed, showered or atomized, by means of one or more sprayers, revolving drums or atomizers; or of a bubbling absorber in which gas is caused to bubble through liquid; or of any other device for directly contacting liquid with gas. The storage equipment may consist of tanks or other receptacle made of material resistant to the action of acid. The utilization equipment may consist of appropriate pipes and pumps or other means for delivering the stored acid to the appropriate place in the sulphuric acid plant, as, for example, to the top of the Glover tower. The nitrogen oxides escaping absorption in the absorption equipment may be conveyed to an appropriate place in the sulphuric acid plant, as, for example, to the top of the Glover tower, where they may be utilized for the manufacture of sulphuric acid.

Instead of bringing the surplus oxides of nitrogen into direct contact with a liquid, the surplus oxides of nitrogen may be at least partially condensed to liquid, by means of cooling the surplus gas, the condensed liquid being collected in a suitable receptacle, and stored for use as may be required, the uncondensed nitrogen oxides being conveyed into the acid plant. The surplus oxides of nitrogen may be absorbed in activated carbon or silica gel, or other absorbing medium, it being understood that this invention covers the absorption, in any absorbent, as well as the condensation, of surplus oxides of nitrogen produced by an ammonia converter, and collecting such surplus, absorbed or condensed. The converter, instead of having two outlet pipes or branches, may have only one, connected directly with an absorbing or condensing apparatus as an inlet duct thereto, such absorbing or condensing apparatus being provided with an outlet duct connected to a sulphuric acid plant, whereby the unabsorbed or uncondensed nitrogen oxides may be conducted into said sulphuric acid plant. In such case the quantity of nitrogen oxides admitted to the sulphuric acid plant from the converter would be regulated by manipulation of the absorbing or condensing apparatus to secure greater, or less, absorption or condensation, as desired.

My method of operation may be clearly understood by reference to the drawing which shows the main features of one form of my apparatus in diagrammatic elevation. The Glover tower of a sulphuric acid plant is represented by 1, into which sulphur-dioxide containing gas is introduced by means of the flue 2. The pipe 13 conducts a mixture of air and gaseous ammonia in suitable proportions into the ammonia converter 3, where, in contact with a catalyst, the ammonia burns to nitrogen oxides, which are conducted away from the converter, through a heat exchanger (not shown) if desired, by means of the pipe 4. Pipe 4 is provided with a valve or plug cock 5, beyond a branch pipe 7, the latter being likewise provided with a valve or plug cock 6. Pipe 4, beyond valve 5, is connected, with or without the intervention of a gas cooler, with the sulphuric acid plant at an appropriate place, preferably near the front end, as, for example, with the Glover tower 1, as shown. Pipe 7, beyond valve 6, is connected with an apparatus for directly contacting liquid with gas. In the illustration such apparatus is represented by the tower 8, which is equipped with the liquid feed pipe 14, and the liquid discharge pipe 9, and the latter conveys the discharged liquid into the tank 10, from which the stored liquid can be drawn to the pump 11, which elevates it to the top of the Glover tower 1. The gas pipe 15 at the top of tower 8 conveys any nitrogen oxides escaping unabsorbed from the tower 8 to some appropriate part of the sulphuric acid plant, as for example, into the top of the Glover tower 1. Pipe 15 may be equipped with a damper, valve or other cut-off or gas-control device is desired. Pipe 15 may be equipped if desired with a blower or fan. The opening 16 at the top of the Glover tower 1 permits the escape of the gases from the Glover tower into the chambers or other equipment for the oxidation of sulphur dioxide to sulphuric acid. Instruments for measuring or for controlling or regulating the quantity of the gas-flow in pipes 4 and 7 may be used if desired.

In operating this device, an approximately constant volume of ammonia-air mixture is blown through pipe 13 into converter 3. When the requirments of the acid plant for nitrogen oxides are approximately equal to the normal capacity of the converter operating at maximum efficiency, valve 6 is closed, and all the nitrogen oxides produced are conveyed through valve 5 into the acid plant. When the acid plant requirements are sub-normal, as much of the nitrogen oxides as is needed flows through valve 5 into the acid plant, and the surplus flows through valve 6 and pipe 7 to the absorber 8, the respective quantities of gas flowing through valves 5 and 6 being regulated as acid plant conditions may require, by means of these valves. In absorber 8 and surplus oxides of nitrogen are absorbed. If the absorption is in water, liquid nitric acid will result. If in sulphuric acid, the discharged liquid will be a mixture of nitric and sulphuric acids, with perhaps some nitrososulphuric acid. In either case the discharged liquid flows through pipe 9 to tank 10, there to be stored until required for use. The absorber 8 may be replaced by a cooled condenser, without direct contact of liquid with gas, if desired, and in such case the condensed liquid will be chiefly nitric acid, and thus may be conducted into the storage tank 10 as previously described. When the storage tank is full, if the acid plant requirements are still sub-normal, valve 6 should be closed, and the quantity of air-ammonia mixture blown through pipe 13 should be diminished. When the acid plant requirements are super-normal, the supply of stored nitric acid or mixed acid in tank 10 is utilized, and this acid is elevated by means of pump 11 to the top of Glover tower 1, and allowed to flow therein, this acid thus serving in time of emergency as an auxiliary to the ammonia converter, permitting the latter to operate at approximately its normal capacity continuously.

I claim:

1. In the manufacture of sulphuric acid by means of oxidized ammonia gas, the method of operating an ammonia converter connected to a sulphuric acid plant substantially continuously at that capacity which permits approximately maximum efficiency, consisting in absorbing in liquid part of the oxides of nitrogen produced, storing the liquid containing such absorbed oxides of nitrogen, and utilizing such stored liquid to supply at least part of the requirements of a sulphuric acid plant for oxides of nitrogen.

2. The herein described method of simultaneously manufacturing, in one apparatus, sulphuric acid, and in another apparatus, mixed nitric and sulphuric acids, by means of the same ammonia converter, consisting in admitting to a sulphuric acid plant part of the nitrogen oxides produced by such converter, and bringing another part into direct contact with sulphuric acid, and using the liquid resulting from such contact for the manufacture of sulphuric acid, in proportion to the requirements of the sulphuric acid process for nitrogen oxides.

3. The herein described method of utilizing the surplus capacity of an ammonia oxidation apparatus connected to a sulphuric acid plant, which consists in bringing the surplus oxides of nitrogen into direct contact with an absorbing liquid, thereafter storing said liquid in a receptacle, after absorption of nitrogen oxides, and using portions of said stored liquid from time to time for the manufacture of sulphuric acid, in quantities proportionate to the requirements of a sulphuric acid process for nitrogen oxides.

4. In the manufacture of sulphuric acid by means of oxidized ammonia gas, the method of utilizing the surplus capacity of an ammonia converter connected to a sulphuric acid plant, which consists, in bringing surplus oxides of nitrogen produced by such converter into direct contact with a medium capable of absorbing oxides of nitrogen, and conveying the unabsorbed oxides of nitrogen into a sulphuric acid plant.

5. The herein described apparatus for utilizing the surplus capacity of an ammonia oxidation plant, comprising an ammonia converter equipped with a catalyst, an inlet duct for air-ammonia gas mixture, a branched outlet duct for oxides of nitrogen, one branch connecting with a sulphuric acid plant, the other branch connecting with apparatus for directly contacting liquid with gas, and apparatus for conveying the liquid resulting from such contact to a sulphuric acid plant.

6. The herein described apparatus for utilizing the surplus capacity of an ammonia oxidation equipment, comprising an ammonia converter equipped with a catalyst, an inlet duct for a mixture of air and ammonia gas, at least two outlet ducts for oxides of nitrogen, one being connected with a sulphuric acid plant, and the other with apparatus for absorbing oxides of nitrogen, and means for conveying the absorbed oxides of nitrogen to a sulphuric acid plant.

7. An ammonia oxidation converter equipped with means for conveying the products of the combustion of ammonia gas to two different apparatus, one such apparatus being a sulphuric acid plant, the other being an apparatus for the absorption of nitrogen oxides, equipped with means for conveying absorbed nitrogen oxides to a sulphuric acid plant.

8. An apparatus for the absorption of nitrogen oxides, provided with a gas-inlet connected to an ammonia oxidation converter, and a gas-outlet connected with a sulphuric acid plant, combined with means for conveying absorbed nitrogen oxides to a sulphuric acid plant.

9. The combination with a sulphuric acid plant of apparatus for the oxidation of ammonia, apparatus for absorbing nitrogen oxides, means for conveying gas discharged from such oxidation apparatus to such sulphuric acid plant, means for conveying gas discharged from such oxidation apparatus to such absorbing apparatus, means for supplying liquid to such absorbing aparatus, means for collecting liquid discharged from such absorbing apparatus, and means for conveying liquid discharged from such absorbing apparatus into a sulphuric acid plant.

10. The combination with a sulphuric acid plant of apparatus for the oxidation of ammonia, apparatus for absorbing nitrogen oxides, means for conveying gas discharged from such oxidation apparatus to such sulphuric acid plant, means for conveying gas discharged from such oxidation apparatus to such absorbing apparatus, means for supplying liquid to such absorbing apparatus, means for collecting liquid discharged from such absorbing apparatus, means for conveying liquid discharged from such absorbing apparatus into a sulphuric acid plant, and means for conveying gas discharged from such absorbing apparatus into a sulphuric acid plant.

11. In the manufacture of sulphuric acid by means of oxidized ammonia, the herein described method of operating an ammonia converter substantially continuously at approximately optimum capacity and maximum efficiency, which consists in absorbing in liquid part of the oxygen-nitrogen compounds produced by such ammonia converter, conveying to a sulphuric acid plant the oxygen-nitrogen compounds escaping absorption, collecting the liquid containing the absorbed nitrogen-oxygen compounds, and utilizing such collected liquid to supply at least part of the requirements of a sulphuric acid plant for oxides of nitrogen.

12. In the manufacture of sulphuric acid by means of oxidized ammonia, the method of operating an ammonia converter connected to a sulphuric acid plant at a substantially constant rate of capacity which consists in collecting and storing surplus nitrogen-oxygen compounds during periods of relatively small acid plant requirements for such compounds, and utilizing such collected and stored compounds to supply at least part of the requirements of a sulphuric acid plant for such compounds during periods of relatively large acid plant requirements for nitrogen-oxygen compounds.

ANDREW M. FAIRLIE.